July 26, 1955  W. H. HEWITT, JR  2,714,182
HALL EFFECT DEVICES
Filed June 21, 1952  2 Sheets-Sheet 1

INVENTOR
W. H. HEWITT JR.
BY
N. S. Ewing
ATTORNEY

July 26, 1955  W. H. HEWITT, JR  2,714,182
HALL EFFECT DEVICES
Filed June 21, 1952  2 Sheets-Sheet 2
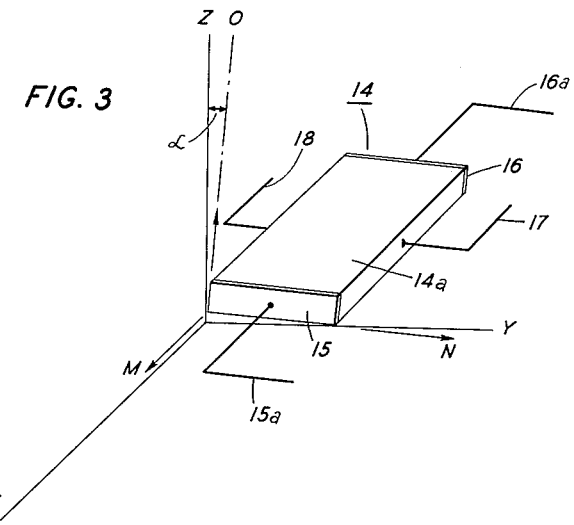
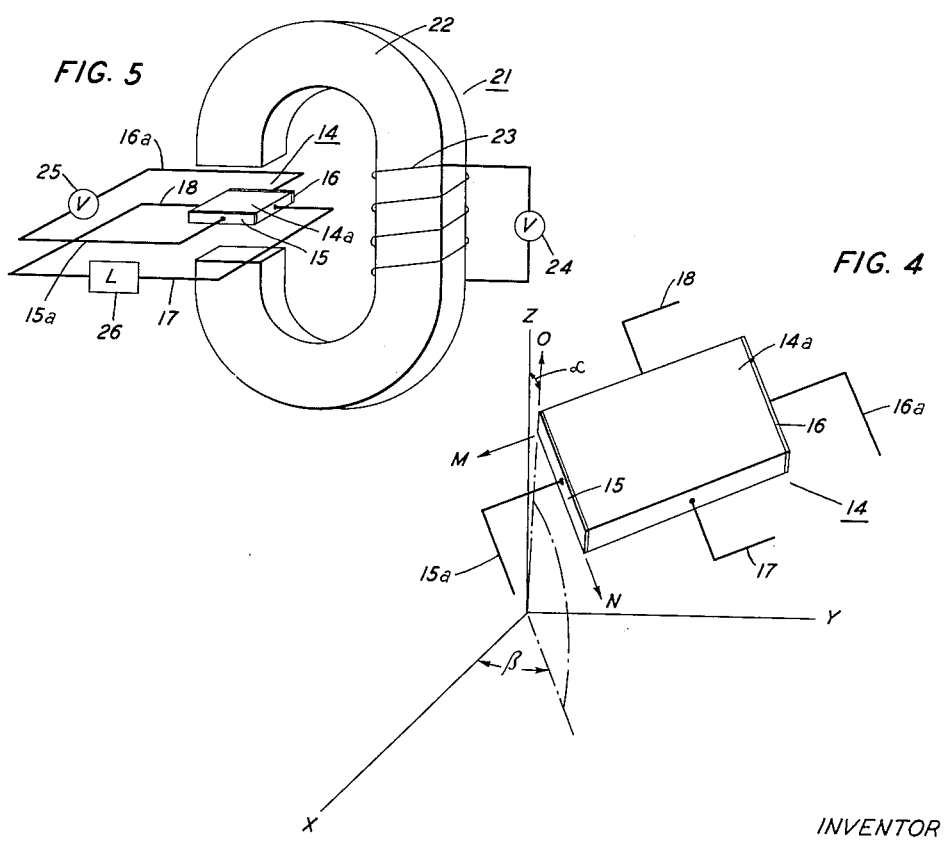
INVENTOR
W. H. HEWITT JR.
BY
N. A. Ewing
ATTORNEY United States Patent Office 2,714,182
Patented July 26, 1955

2,714,182

HALL EFFECT DEVICES

William H. Hewitt, Jr., Mendham, N. J., assignor to Bell Telephone Laboratories, Incorporated, New York, N. Y., a corporation of New York Application June 21, 1952, Serial No. 294,940

10 Claims. (Cl. 317—234)

This invention relates to Hall effect units and electric translating devices employing such units.

A Hall effect unit comprises typically a rectangular plate, or squat prism, of crystalline material (such as germanium of N-type conductivity) with an electrode on each of the four lateral faces. As the unit is used, electric current is supplied to one pair of opposite electrodes, a magnetic field is applied in a direction normal to the plate, and an output voltage is derived from the other pair of opposite electrodes. The output voltage is found to be more or less proportional, at low field intensities, to the product of the input current and the applied magnetic field.

Such units have been used heretofore in flux meters, in which case the Hall effect unit is ordinarily mounted as a probe that may be conveniently inserted into the magnetic field to be measured and the current to the input electrodes is maintained constant. The Hall effect unit is also adapted for use in a pure product modulator in which case the magnetic field is provided by an electromagnet that is energized by one of the currents to be intermodulated and in which the other current to be intermodulated is applied to the input electrodes of the Hall effect unit. The output voltage is then more or less proportional to the product of the amplitudes of the currents applied to the input electrodes and the electromagnet.

The relationship between the output voltage and the product of the input current and the magnetic field in such devices is not an accurately proportional or linear one, especially at high field strengths. In the case of the flux meter under high field conditions it is necessary, therefore, to apply correction factors to the direct meter readings to deduce the true field strength. In the case of product modulators, the non-linearity of the relationship is reflected in the distortion or in unwanted modulation products in the output voltage.

The principal object of this invention is to reduce non-linearity in the relationship between the output voltage of a Hall effect unit and the product of the applied current and field, and more particularly to reduce such linearity in devices of the kind described.

The foregoing objects are attained in accordance with the invention by observing certain critical relationships between the crystallographic axes of the crystalline body comprising a Hall effect unit, and the directions in which the magnetic field and current are applied. That is to say, in the instance where the Hall effect unit is a rectangular plate having two pairs of electrodes placed on its lateral faces so that the electrodes of each pair are oppositely disposed along the mutually perpendicular transverse axes of the plate and a field is applied in a direction normal to the surface of the plate (parallel to the lateral axis of the plate), two crystallographic axes will be arranged to occupy predetermined positions relative to the transverse axes of the plate (or lines between the electrodes of each pair) and the third crystallographic axis will be arranged to occupy a predetermined position with respect to the lateral axis of the plate.

The non-linearity observed can be attributed to one or more and usually all of these factors:

1. A cross voltage appearing at the output electrodes due to a magneto-resistive effect which is proportional to the square of the magnetic field;
2. Variations in the Hall coefficient with the applied field; and
3. Cross voltages due to magneto resistive effects which are proportional to higher powers of the magnetic field.

The first factor can be minimized or substantially eliminated by applying the magnetic field either in a direction perpendicular to one of the crystallographic axes or in a direction lying in a plane defined by one crystallographic axis and a direction 45 degrees between the other two crystallographic axes; and by applying the current in a direction that is perpendicular to the direction of the magnetic field and that lies either in the above defined plane or perpendicular to it. To minimize the second factor, it suffices to apply the magnetic field along one crystallographic axis and the current in a direction lying in the plane of the other two axes. In this latter orientation both the first and the second factors are minimized. While this orientation tends to make the output voltage linear with the product of the applied current and field over a range of low field intensities, it is found that over a wider range of field intensities the relation is substantially non-linear. The latter effect is largely, although not exclusively, attributable to the third factor.

In accordance with a feature of the invention, a Hall effect plate is cut from the mother crystal with such orientation relative to the crystallographic axes that the output voltage of the unit is substantially linearly related to the product of the applied current and field over a broad range of field values. More specifically, in a preferred embodiment comprising a plate of germanium of N-type conductivity, having an initial resistivity of 11.5 ohm-centimeters, maximum linearity of the relation is achieved with the plate cut so that one crystallographic axis, or a line 45 degrees between this one crystallographic axis and another crystallographic axis, is parallel to the direction in which the current is applied to the unit and the third crystallographic axis is inclined by substantially 12½ degrees to the direction of the applied magnetic field.

It should be understood that in a crystal having cubic symmetry, such as a germanium crystal, the three crystallographic axes are equivalent and interchangeable, but for purposes of defining the orientation of the plate each of the axes will be assigned a distinctive designation.

The nature of the present invention, as well as its features, will be more fully understood from the following detailed description and by reference to the accompanying drawings in which:

Figs. 3 and 4 represent views in perspective of Hall effect units having their geometric axes oriented with reference to their individual crystallographic axes in accordance with the invention; and Fig. 5 shows an electric translating device employing an electromagnet and a Hall effect unit in accordance with the invention.

Figure 1:
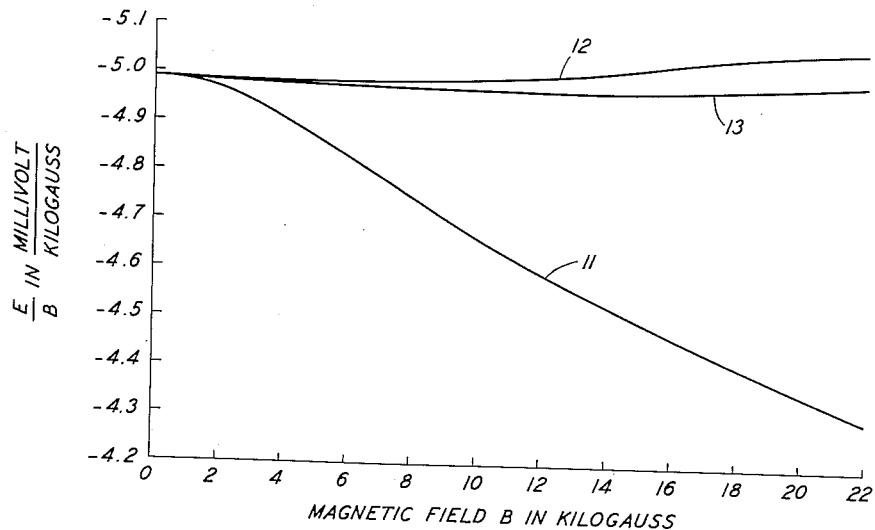
Fig. 1 is a graph showing the relation between the output voltages and the magnetic field for various orientations of a Hall effect unit.

The significance of crystallographic orientation with respect to linearity or non-linearity in the relation between the output voltage E, and the product of the magnetic field B and the applied current I, will be evident upon consideration of Fig. 1 where there is plotted, for each of three different orientations of a specific Hall effect unit, the relation between the ratio E/B and B for constant input current I. Insofar as the ratio E/B is constant and independent of B, the unit has the desired linear characteristics.

Curve 11 of Fig. 1 applies specifically to a germanium plate of N-type conductivity cut so that one crystallographic axis is in the direction of the applied current, and a line 45 degrees between the other two crystallographic axes is in the direction of the applied magnetic field. In this case the ratio E/B falls by as much as 6 per cent at 10,000 gauss below the ratio at 1,000 gauss. Further, at 22,000 gauss the ratio drops to 13 per cent less than that at 1,000 gauss, thereby displaying the inability of this orientation to produce an output voltage that is proportional to the applied current and field. With the crystalline plate cut so that one crystallographic axis is in the direction of the applied current and another crystallographic axis is in the direction of the applied magnetic field, the Hall effect unit does exhibit an output voltage-magnetic field ratio E/B that is substantially constant out to 10,000 gauss as illustrated by curve 12 of Fig. 1, but at 22,000 gauss this ratio departs by nearly 2 per cent from its value at 1,000 gauss.

Curve 13 of Fig. 1 applies to a Hall effect unit, the plate of which is cut so that one crystallographic axis is in the direction in which the current is applied in the unit and another crystallographic axis is inclined by substantially 12½ degrees to the direction of the applied magnetic field. It will be observed that the ratio E/B is substantially constant over a broad range of field intensities, decreasing from the ratio at 1,000 gauss by less than four tenths of 1 per cent at 10,000 gauss, and at 22,000 gauss being equal to the ratio at 1,000 gauss.

Figure 2:
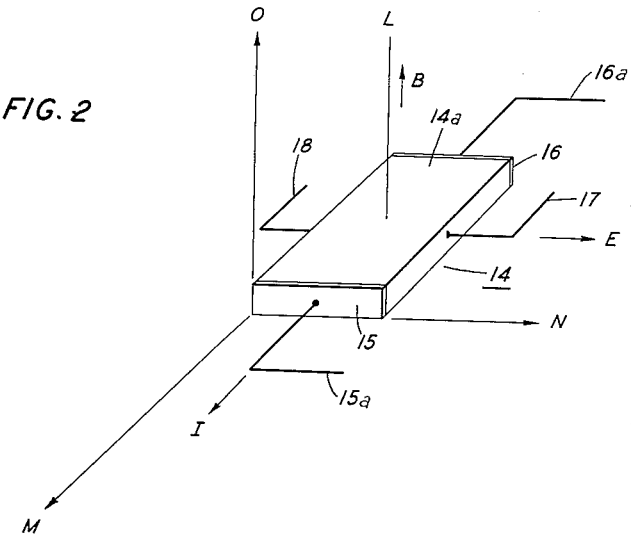
Fig. 2 shows the direction of the magnetic field, applied current, and generated voltage in a Hall effect unit taken with reference to its geometric axes.

In Fig. 2 a Hall effect unit 14 is shown in the form of a rectangular plate 14a of a semiconductive material such as germanium of N-type conductivity, having electrodes 15 and 16 fixed to two of its oppositely disposed lateral faces, and electric conductors 15a and 16a attached each to the center of one electrode. Ohmic contact is made at the center of the other oppositely disposed lateral faces of the unit by conductors 17 and 18. The geometric axes of the Hall effect unit will be designated as follows: M is the "transverse axis" perpendicular to the particular lateral faces that carry the current input electrodes 15 and 16; N is the "transverse axis" perpendicular to the particular faces to which the voltage output inductors 17 and 18 are attached; and O is the "lateral axis" normal to the major faces of the plate. In accordance with the Hall effect principle, the current I is applied through conductors 15a and 16a and has a direction parallel to the M axis, the magnetic field B is applied in a direction parallel to the O axis, and the generated voltage E, in a direction parallel to the N axis, is taken off through conductors 17 and 18.

Hall effect units constructed in accordance with the description of Fig. 2 are shown in Figs. 3 and 4 oriented with respect to their respective crystallographic axis which in accordance with the terms used by crystallographers are designated X, Y and Z. The orientation of the plate in each figure can be described by assuming that initially the geometric axes M, N and O are parallel to the crystallographic axes X, Y and Z in that order, and by then specifying the successive rotation of the plate about certain of the axes. For the present purposes the first rotation will be taken as the rotation of the plate through an angle α about the M axis (which initially is aligned with the X axis), the second rotation as that through an angle β about the Z axis, and the third and last as that through an angle δ about the O axis.

In the unit illustrative of the invention shown in Fig. 3, the Hall effect plate 14a is rotated around the M axis through 12½ degrees from the assumed initial condition. In this instance there is no rotation about the Z or O axes. The unit shown in Fig. 4 is defined by rotating the Hall effect plate 14a around the M axis by 12½ degrees and around the Z axis by 45 degrees. There is no rotation about the O axis.

Bearing in mind that the germanium crystal has cubic symmetry, it will be understood that in Fig. 3 the plate may be rotated about the Z axis through any multiple of 90 degrees, that is, any even multiple of 45 degrees, and that in Fig. 4 the plate may be rotated about the Z axis through any odd multiple of 45 degrees.

The orientations illustrated in Figs. 3 and 4 also fulfill the requirements for minimizing the aforementioned cross voltage appearing on the conductors 17 and 18 due to the magneto-resistive effect and the second order magnetic fields. The table below discloses all of the orientations for which this cross voltage is substantially eliminated:

|   | α Rotation about M | β Rotation about Z | δ Rotation about O |
|---|---|---|---|
| 1 | 0° | any angle | 0° or 90°. |
| 2 | any angle | 0° | 0° or 90°. |
| 3 | any angle | 45° | 0° or 90°. |

It will be noted that the class defined by Example 2 above includes the oriented unit shown in Fig. 3, and the class defined by Example 3 above includes the oriented unit shown in Fig. 4.

In Fig. 5 an electric translating device is shown comprising a Hall effect unit 14 which may have its axes oriented in accordance with the invention, and an electromagnet 21. The electromagnet 21 is made up of a magnetic core 22 so shaped as to produce a parallel and evenly distributed field across a small gap and having wound around it a coil 23 which is attached to a variable voltage source 24. (In Figure 5 the dimension of the gap is exaggerated for purposes of clarity in illustration.) The Hall effect unit 14 comprises a thin rectangular Hall effect plate 14a of germanium of N-type conductivity having electrodes 15 and 16 and conductors 15a, 16a, 17 and 18 all connected as described in Fig. 2, a current source 25 attached to conductors 15a and 16a and a load 26 attached to conductors 17 and 18. The plate is cut so that when placed in the gap of the electromagnet 21 with its lateral axis parallel to the direction of the variable magnetic field, one of its crystallographic axes or a line 45 degrees between this one crystallographic axis and another crystallographic axis will be parallel to the direction in which the current is applied through electrodes 15 and 16, and the other of its axes will be inclined by substantially 12½ degrees to the direction of the applied magnetic field. The output voltage of the unit as it appears in the load 26 will be proportional to the product of the current and field applied to the Hall effect unit 14.

It is to be understood that the above-described arrangements are illustrative of the application of the principles of the invention. Numerous other arrangements may be devised by those skilled in the art without departing from the spirit and scope of the invention.

What is claimed is:

1. A Hall effect unit comprising a monocrystalline body of semiconductive material having three mutually perpendicular geometric axes, one crystallographic axis of said body being displaced from a first of said geometric axes about a second of said geometric axes by a multiple of 45 degrees, and another crystallographic axis being inclined by substantially 12½ degrees to said second geometric axis.

2. A Hall effect unit according to claim 1 in which said monocrystalline body comprises germanium of N-type conductivity.

3. A Hall effect unit comprising a monocrystalline body of semiconductive material in the shape of a right prism including electrodes lying in contact with the lateral faces of said body and spaced at equal angles about the lateral axis, one crystallographic axis being displaced from the center of one said electrode about said lateral axis by a multiple of 45 degrees, and another crystallographic axis being inclined by substantially 12½ degrees to said lateral axis.

4. A Hall effect unit comprising a monocrystalline body of N-conductivity type germanium in the shape of a right rectangular prism including one pair of opposed input electrodes and one pair of opposed output electrodes lying in a common plane, each electrode in contact with one lateral face of said body, one crystallographic axis being parallel to a line between said input electrodes, and another crystallographic axis being inclined by substantially 12½ degrees to the lateral axis of said prism.

5. A Hall effect unit comprising a monocrystalline body of N-conductivity type germanium in the shape of a right rectangular prism including one pair of opposed input electrodes and one pair of opposed output electrodes lying in a common plane, each electrode in contact with one lateral face of said element, a line 45 degrees between two crystallographic axes of said body being parallel to a line between said input electrodes, and the other crystallographic axis being inclined by substantially 12½ degrees to the lateral axis of said prism.

6. A Hall effect device comprising an electromagnet and a Hall effect unit lying in the magnetic field of said electromagnet, said unit comprising a monocrystalline body of semiconductive material and at least one pair of electrodes, one crystallographic axis of said body being displaced from a line between the electrodes of said pair by a multiple of 45 degrees and another crystallographic axis being inclined by substantially 12½ degrees to the direction of said magnetic field.

7. A Hall effect device comprising an electromagnet and a Hall effect unit lying in the magnetic field of said electromagnet, said unit comprising a monocrystalline body of N-conductivity type germanium, one pair of opposed input electrodes and one pair of opposed output electrodes, one crystallographic axis of said body being parallel to a line between said input electrodes and another crystallographic axis being inclined by substantially 12½ degrees to the direction of said magnetic field.

8. A Hall effect device comprising an electromagnet and a Hall effect unit lying in the magnetic field of said electromagnet, said unit comprising a monocrystalline body of N-conductivity type germanium, one pair of opposed input electrodes and one pair of opposed output electrodes, a line 45 degrees between two crystallographic axes of said body being parallel to a line between said input electrodes, and the other crystallographic axis being inclined by substantially 12½ degrees to the direction of said magnetic field.

9. A device for translating an applied electric current and an applied magnetic field into an output voltage comprising an electromagnet and a Hall effect unit lying in the magnetic field of said unit comprising a monocrystalline body of semiconductor material, one pair of input current electrodes and one pair of output voltage electrodes, and means for orienting one crystallographic axis of said body at a critical angle with respect to said magnetic field where the current in the output voltage electrodes is proportional to said magnetic field and the current in said input electrodes.

10. A device for translating an applied electric current and an applied magnetic field into an output voltage comprising an electromagnet and a Hall effect unit lying in the magnetic field of said electromagnet, said unit comprising a monocrystalline body of semiconductive material, one pair of input electrodes and one pair of output electrodes, and means for orienting one crystallographic axis of said body at a first critical angle with respect to said magnetic field and another crystallographic axis at a second critical angle with respect to a line between said input electrodes where the current in said output voltage electrodes is proportional to said magnetic field and current in said input electrodes.

References Cited in the file of this patent

UNITED STATES PATENTS

| | | |
|---|---|---|
| 2,616,074 | McCreary | Oct. 28, 1952 |
| 2,619,627 | Slepian | Nov. 25, 1952 |
| 2,649,574 | Mason | Aug. 18, 1953 |